United States Patent
Tsay et al.

(10) Patent No.: US 7,957,095 B1
(45) Date of Patent: *Jun. 7, 2011

(54) DISK DRIVE HAVING A STATIONARY PLATE FACING A DISK AND WITH A RECIRCULATION FILTER COUPLED TO GROOVES IN THE STATIONARY PLATE

(75) Inventors: Alex Y. Tsay, Fremont, CA (US); Chunjer C. Cheng, Saratoga, CA (US); Lin Yang, San Jose, CA (US); Jin Hui Ou-Yang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/419,142

(22) Filed: Apr. 6, 2009

Related U.S. Application Data

(63) Continuation of application No. 11/305,550, filed on Dec. 16, 2005, now Pat. No. 7,593,181.

(51) Int. Cl.
*G11B 33/14* (2006.01)
(52) U.S. Cl. .................................................. 360/97.03
(58) Field of Classification Search ............... 360/97.01, 360/97.03, 97.04
See application file for complete search history.

(56) References Cited

U.S. PATENT DOCUMENTS

| | | | |
|---|---|---|---|
| 4,369,475 A | 1/1983 | Ho et al. | |
| 4,710,830 A | 12/1987 | Imai et al. | |
| 4,885,652 A * | 12/1989 | Leonard et al. | 360/133 |
| 4,922,354 A | 5/1990 | Edwards | |
| 5,012,365 A | 4/1991 | Yokoyama | |
| 6,097,568 A | 8/2000 | Ekhoff | |
| 6,236,532 B1 * | 5/2001 | Yanagisawa | 360/97.02 |
| 6,549,365 B1 * | 4/2003 | Severson | 360/97.02 |
| 6,709,498 B2 | 3/2004 | Tuma | |
| 6,894,867 B2 | 5/2005 | Hong et al. | |
| 6,989,959 B2 * | 1/2006 | Chang et al. | 360/97.02 |
| 7,379,265 B2 | 5/2008 | Wang et al. | |
| 7,593,181 B1 * | 9/2009 | Tsay et al. | 360/97.03 |
| 2004/0212920 A1 | 10/2004 | Tadepalli et al. | |
| 2005/0185325 A1 | 8/2005 | Hur | |
| 2005/0190488 A1 | 9/2005 | Chan et al. | |
| 2006/0002008 A1 * | 1/2006 | Lim | 360/97.02 |
| 2006/0114603 A1 * | 6/2006 | Ser et al. | 360/97.02 |

FOREIGN PATENT DOCUMENTS

JP        62-129991        6/1987

OTHER PUBLICATIONS

U.S. Appl. No. 11/305,550 to Alex Y. Tsay, et al., filed Dec. 16, 2005, 16 pages.

* cited by examiner

*Primary Examiner* — Brian E Miller
*Assistant Examiner* — Adam B Dravininkas

(57) ABSTRACT

A novel disk drive is disclosed and claimed. The disk drive includes a disk and a spindle motor to which the disk is attached to rotate about an axis of rotation. The disk drive also includes a stationary plate facing and disposed over the disk, wherein the stationary plate includes a plurality of grooves through which rotation-induced air flows from an inlet end to an outlet end. The disk drive also includes a recirculation filter coupled to and immediately adjacent said outlet end of said plurality of grooves.

6 Claims, 4 Drawing Sheets

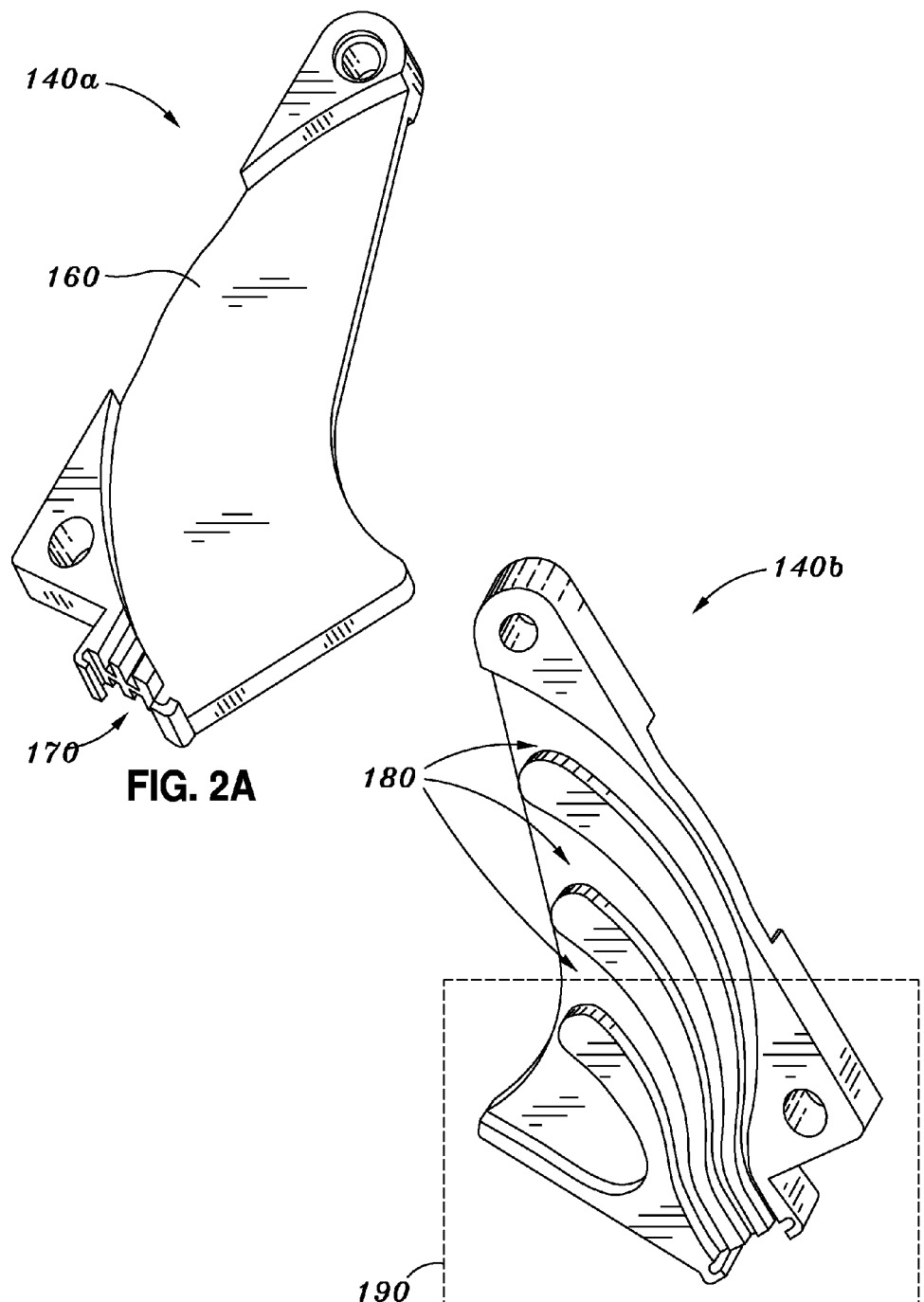

DISK DRIVE HAVING A STATIONARY PLATE FACING A DISK AND WITH A RECIRCULATION FILTER COUPLED TO GROOVES IN THE STATIONARY PLATE

CROSS-REFERENCE TO RELATED APPLICATION

This application is a Continuation of pending U.S. patent application Ser. No. 11/305,550, entitled "DISK VIBRATION DAMPER HAVING AN INTEGRATED AIR CIRCULATION GUIDE," filed on Dec. 16, 2005, which is incorporated herein by reference in its entirety.

BACKGROUND OF THE INVENTION

The invention relates in general to data storage systems such as disk drives, and in particular to a disk vibration damper having integrated air circulation guide.

Hard disk drives (HDDs) are sensitive to vibration, with the performance and reliability of an HDD being adversely affected by excessive vibration of the disks. Vibration in hard disk drives (HDDs) can cause read/write errors and/or significant problems with the control and stability of the drive's servo-mechanical system. Disk vibration can be exacerbated by large-scale pressure variations in the airflow that is caused by disk rotation.

HDDs are also sensitive to particulate contaminates. Accordingly, the airflow caused by disk rotation must be filtered to remove potentially harmful particulate matter. To that end, recirculation filters are an important component of the HDD since particulate matter on disk's surface can significantly interfere with the operation of the HDD's read/write head. Typically, such recirculation filters are placed at a low pressure region off the disk where the airflow tends to migrate.

One method used to dampen disk vibration disks has been to place a stationary plate between disks. In addition to serving as a spoiler to destroy large-scale flow features that might lead to large-scale pressure variations, the stationary plate, in conjunction with the air (or other gas) surrounding the disks, also produces a squeezed-film effect whereby the compressed air between the individuals disks would exert a stabilizing force on the adjacent disks. However, such vibration dampers have not significantly enhanced the air filtering process. Given the HDD market trend towards reductions in both the cost and the physical size of HDDs, reducing the total part count within the HDD (for example by somehow providing additional functionality to an existing part) can significantly enhance the competitiveness of an HDD manufacturer's product. Thus, there is a need in the art for a disk vibration dampener that also improves the efficiency of the HDD recirculation filter.

SUMMARY OF THE INVENTION

A novel disk drive is disclosed and claimed. The disk drive includes a disk and a spindle motor to which the disk is attached to rotate about an axis of rotation. The disk drive also includes a stationary plate facing and disposed over the disk, wherein the stationary plate includes a plurality of grooves through which rotation-induced air flows from an inlet end to an outlet end. The disk drive also includes a recirculation filter coupled to and immediately adjacent said outlet end of said plurality of grooves.

BRIEF DESCRIPTION OF THE DRAWINGS

FIGS. 2A-2B are top and bottom perspective views of one embodiment of a stationary plate of the invention;

DETAILED DESCRIPTION OF THE EXEMPLARY EMBODIMENTS

According to certain embodiments of the invention, a single stationary plate is disposed between two adjacent disks, wherein the stationary plate has a grooved side through which rotation-induced air may flow. In certain other embodiments, a plurality of stationary plates may be disposed between a plurality of disks, wherein each of the plurality of stationary plates has a grooved side through which the rotation-induced air may flow. The stationary plate may be adjacent to the disk for between about 30 degrees and about 270 degrees with respect to the disk's axis of rotation.

In certain embodiments of the invention, the aforementioned grooves have an inlet side and an outlet side, and the width of the grooves at the inlet side is greater than the width of the grooves at the outlet side. In certain embodiments, the grooves gradually taper so as to increase the air pressure inside the grooves to improve the dampening and suppressor effect of the stationary plate. In certain embodiments, the angle of the inlet side, as measured relative to the rotational motion of the disk, ranges between 0 degrees and approximately 45 degrees.

In certain embodiments of the invention, airflow from the aforementioned outlet side impinges upon the disk drive's voice coil motor (VCM), thereby cooling the VCM.

Figure 1A:
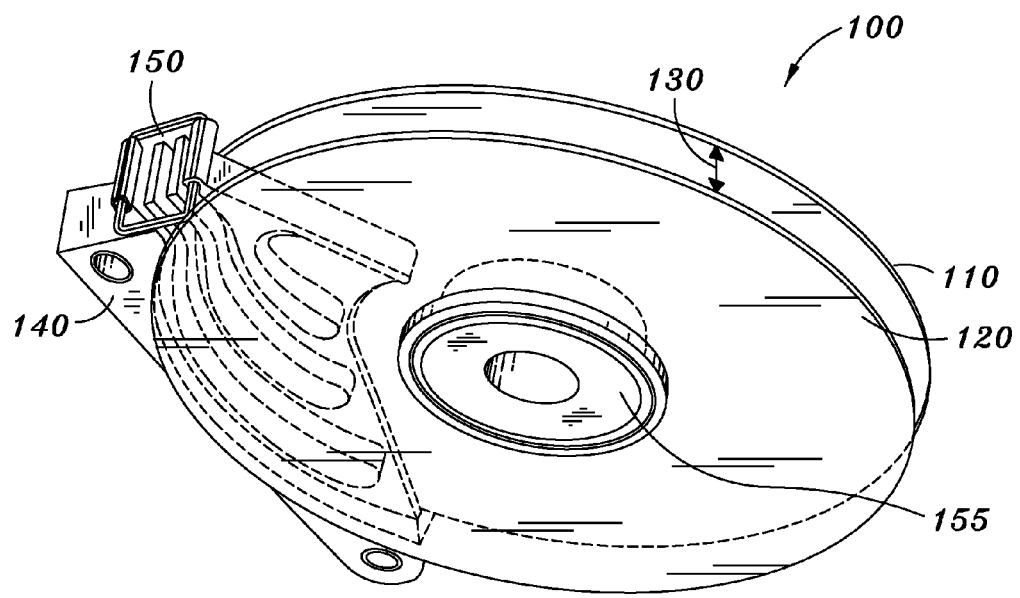
FIGS. 1A-1B are perspective views of a two-disk implementation of one embodiment of the invention.
Figure 1B:
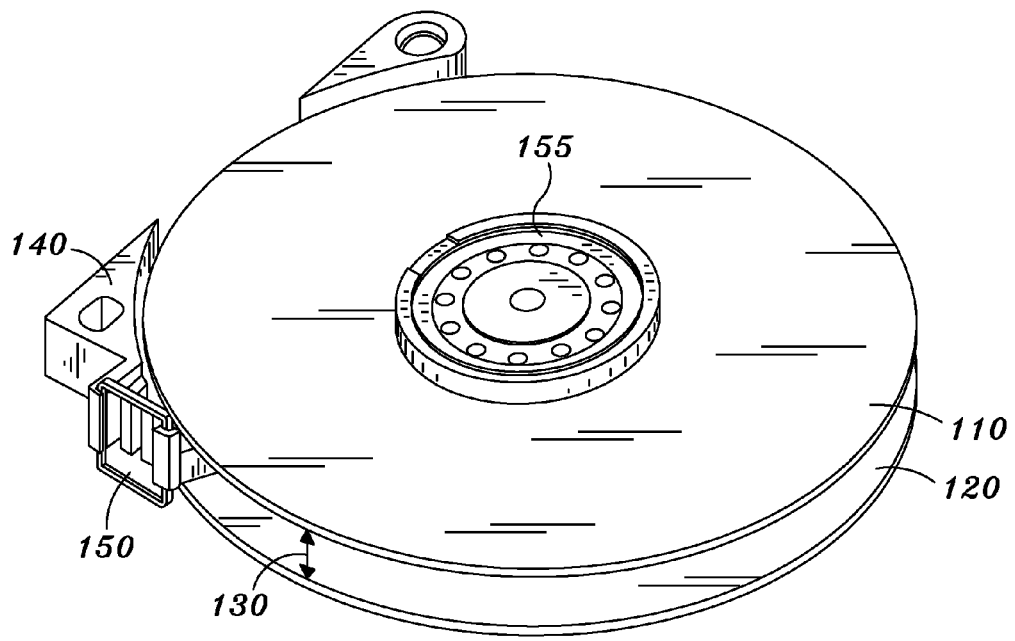

FIGS. 1A-1B depict perspective views of a two-disk implementation of one exemplary embodiment of the invention. In this embodiment, disk assembly 100 comprises an upper disk 110 and a lower disk 120 separated by a distance 130. As is known in the art, the disks rotate about a central axis by rotating a spindle motor hub 155 using an attached spindle motor (not shown). While depicted in FIGS. 1A-1B as a two-disk implementation, it should equally be appreciated that the disk assembly 100 similarly may be comprised of one or more than two disks.

The rotation of disks 110 and 120 causes airflow that can exacerbate disk vibration, as previously discussed. In order to suppress or dampen this effect, one embodiment of the invention is to dispose stationary plate 140 between the top disk 110 and bottom disk 120, as shown in FIG. 2. As will be described in more detail below, the stationary plate 140 also includes one or more grooves configured to channel this airflow towards filter 150.

While FIGS. 1A-1B depict only a single stationary plate 140 disposed between two disks 110 and 120, it should equally be appreciated that the disk assembly 100 may include a plurality of stationary plates disposed between a plurality of disks, wherein each of the plurality of stationary plates has a grooved side through which the rotation-induced air may flow. In one embodiment, the plurality of stationary plates is configured so that the grooved side of each plate faces in a common direction. The disk assembly 100 may have only a single disk, as in the case of a so-called "depopulated" disk drive, in which case one or two stationary plates may be used.

FIGS. 2A and 2B depict perspective views of the stationary plate 140 of FIGS. 1A-1B. In particular, FIG. 2A depicts a first side 140a of the stationary plate 140, while FIG. 2B depicts a second side 140b of the stationary plate 140. In the exemplary embodiment of FIG. 2A, side 140a is depicted as having a essentially flat surface 160 which is to be oriented adjacent to but separated from one of the disks 110 and 120 of FIGS. 1A-1B. In one embodiment, side 160 is separated from an adjacent disk by no more than approximately 0.5 mm. In addition, FIG. 2A further depicts a filter insert 170 to which a recirculation filter may be secured. FIG. 2B, on the other hand, depicts side 140b of plate 140, which represents the other side of stationary plate 140a. In one embodiment, side 140b is separated from an adjacent disk by no more than approximately 0.5 mm.

Side 140b is further depicted as having a series of grooves 180 through which rotationally-induced air may flow. While in the embodiment of FIG. 2B, the plate side 140b is depicted as having three grooves, it should similarly be appreciated that the plate side 140b may have more or less grooves. In one embodiment, the plate side 140b has between one and fifteen grooves. In addition, while the grooves of plate side 140b are shown as being on only one side of the plate, in another embodiment the grooves may also be located on plate side 140a of FIG. 2A.

Figure 3:
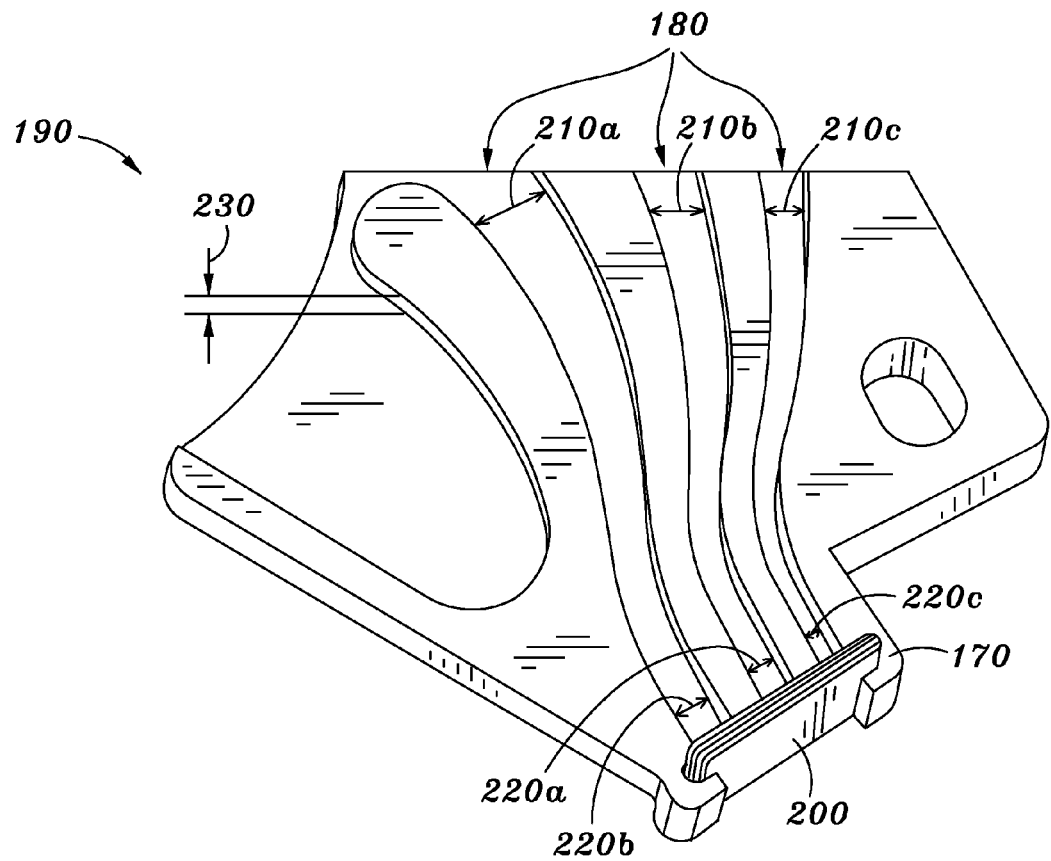
FIG. 3 is a perspective view of a portion of the stationary plate of FIG. 2B.

FIG. 3 is one exemplary embodiment of the area 190 outlined in FIG. 2B. In this embodiment, each groove 180 has an inlet side having an inlet width 210a-210c. In addition, each groove 180 also has an outlet side having an outlet width 220a-220c. In certain embodiments, the groove's inlet widths 210a-210c are greater than the outlet widths 220a-220c. In addition, the widths of grooves 180 may gradually taper from the inlet widths 210a-210c to the outlet widths 220a-220c, as shown in FIG. 3. In certain embodiments, the size of the outlet widths 220a-220c may be between 20% and 80% of the size of the inlet widths 210a-210c.

In the embodiment shown in FIG. 3, the grooves 180 taper closer to the outlet end (near filter 200) which causes the air pressure to build up inside the grooves 180. In one embodiment, this increased air pressure improves the dampening and suppressor effect of the stationary plate 140.

In the embodiment shown in FIG. 3, the grooves 180 have a depth 230. It should be appreciated that this depth 230 may vary, but in certain embodiments is no greater than 80% of the distance 115 between disks 110 and 120 of FIGS. 1A-1B. FIG. 3 further depicts the placement of a recirculation filter 200 within filter insert 170, in the embodiment shown.

It should further be appreciated that recirculation filter 200 may comprise a known recirculation filter that is capable of removing particulate matter from the rotationally-induced airflow. In one embodiment, the recirculation filter 200 may be placed at the outlet end of grooves 180 since this is where much of the rotationally-induced airflow will travel, as well as to further increase the resistance of the airflow to exit, thereby improving the suppressor or dampening effect of the stationary disk 140.

Figure 4:
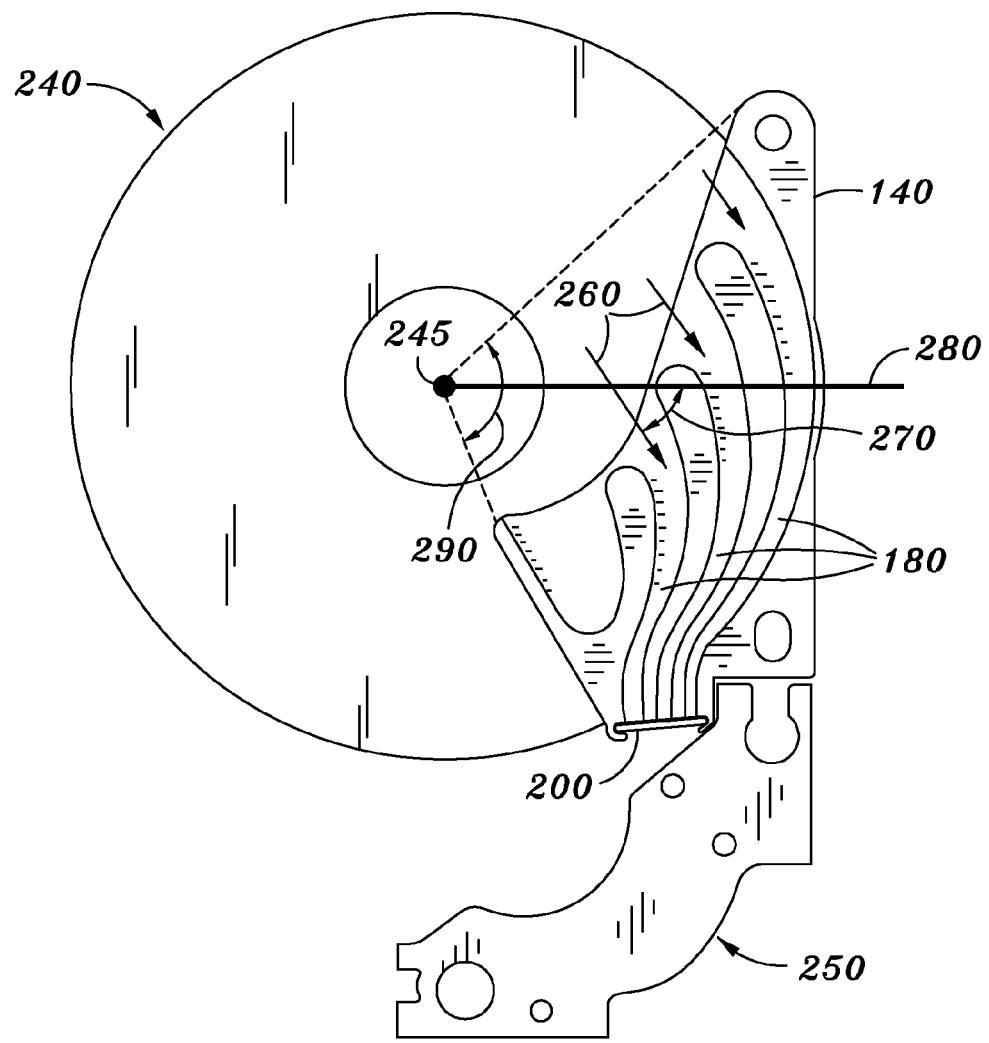
FIG. 4 is a top view showing the relative orientation of a disk, stationary plate and voice coil motor of one embodiment of the invention.

FIG. 4 is a top view showing the orientation of a disk 240 and voice coil motor 250 in relation to the stationary plate 140, in accordance with an embodiment of the invention. In the embodiment shown, disk 240 rotates about axis 245 with stationary plate 140 oriented adjacent to but separated from the disk 240, as shown in FIG. 4. Rotationally-induced airflow 260 enters grooves 180, as shown in FIG. 4, and exits through filter 200. Moreover, VCM 250 is oriented adjacent to filter 200 such that rotationally-induced airflow 260 impinges the VCM 250. In certain embodiments, this configuration enables the airflow 260 to cool the VCM 250.

Airflow 260 enters the grooves 180 at a particular inlet angle, depending on curvature of the grooves 180. In the embodiment of FIG. 4, the inlet angle 270 is measured from horizontal 280 relative to the rotational motion of disk 240. In certain embodiments, the inlet angle ranges between 0 degrees and approximately 45 degrees.

In certain embodiments, the stationary plate 140 may be adjacent to the disk 240 for between about 30 degrees and about 270 degrees with respect to the axis of rotation 245. For example, in the embodiment of FIG. 4 the stationary plate 140 is adjacent to the disk 240 for approximately 110 degrees, as shown by angle 290.

In the foregoing specification, the invention is described with reference to specific exemplary embodiments thereof, but those skilled in the art will recognize that the invention is not limited thereto. It is contemplated that various features and aspects of the above-described invention may be used individually or jointly and possibly in an environment or application beyond those described herein. The specification and drawings are, accordingly, to be regarded as illustrative and exemplary rather than restrictive. The terms "comprising," "including," "with," and "having," as used herein, are intended to be read as open-ended terms.

We claim:

1. A disk drive comprising:
 an upper disk;
 a lower disk;
 a spindle motor to which the upper disk and lower disk are attached to rotate about an axis of rotation;
 a stationary plate disposed between said upper disk and lower disk, said stationary plate comprising
  a plurality of grooves through which rotation-induced air flows from an inlet end to an outlet end,
  a top side facing said upper disk, and
  a bottom side facing said lower disk; and
 a recirculation filter coupled to and immediately adjacent said outlet end of said plurality of grooves,
 wherein the inlet end of one of the plurality of grooves is closer to the axis of rotation than the outlet end of the same groove.

2. The disk drive of claim 1, wherein said inlet end has an inlet angle of between 0 degrees and 45 degrees relative to a rotational motion of an adjacent disk to the inlet end.

3. A disk drive comprising:
 an upper disk;
 a lower disk;
 a spindle motor to which the upper disk and lower disk are attached to rotate about an axis of rotation;
 a stationary plate disposed between said upper disk and lower disk, said stationary plate comprising
  a plurality of grooves through which rotation-induced air flows from an inlet end to an outlet end,
  a top side facing said upper disk, and
  a bottom side facing said lower disk; and
 a recirculation filter coupled to and immediately adjacent said outlet end of said plurality of grooves, and
 a voice coil motor positioned adjacent to said recirculation filter without any intervening structure where said rotation-induced air impinges on said voice coil motor.

4. A disk drive comprising:
 a disk;
 a spindle motor to which the disk is attached to rotate about an axis of rotation;
 a stationary plate facing and disposed over said disk, wherein the stationary plate includes a plurality of grooves through which rotation-induced air flows from an inlet end to an outlet end; and
 a recirculation filter coupled to and immediately adjacent said outlet end of said plurality of grooves, wherein the inlet end of one of the plurality of grooves is closer to the axis of rotation than the outlet end of the same groove.

5. The disk drive of claim 4, wherein said inlet end has an inlet angle of between 0 degrees and 45 degrees relative to a rotational motion of said disk.

6. A disk drive comprising:

a disk;

a spindle motor to which the disk is attached to rotate about an axis of rotation;

a stationary plate facing and disposed over said disk, wherein the stationary plate includes a plurality of grooves through which rotation-induced air flows from an inlet end to an outlet end; and a recirculation filter coupled to and immediately adjacent said outlet end of said plurality of grooves, and a voice coil motor positioned adjacent to said recirculation filter without any intervening structure where said rotation-induced air impinges on said voice coil motor.

* * * * *